(12) United States Patent
Evans et al.

(10) Patent No.: US 10,288,812 B1
(45) Date of Patent: May 14, 2019

(54) FIBER OPTIC-TO-WAVEGUIDE COUPLING ASSEMBLY WITH OVERLAP FOR EDGE COUPLING

(71) Applicant: CORNING INCORPORATED, Corning, NY (US)

(72) Inventors: Alan Frank Evans, Beaver Dams, NY (US); Davide Domenico Fortusini, Painted Post, NY (US); Qijun Xiao, Fremont, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/009,953

(22) Filed: Jun. 15, 2018

Related U.S. Application Data

(60) Provisional application No. 62/641,516, filed on Mar. 12, 2018.

(51) Int. Cl.
*G02B 6/30* (2006.01)
*G02B 6/36* (2006.01)

(52) U.S. Cl.
CPC ............. *G02B 6/30* (2013.01); *G02B 6/3636* (2013.01)

(58) Field of Classification Search
None
See application file for complete search history.

(56) References Cited

U.S. PATENT DOCUMENTS

| 5,218,663 | A | * | 6/1993 | Isono | G02B 6/122 |
| | | | | | 385/129 |
| 6,118,917 | A | | 9/2000 | Lee et al. | |
| 6,160,936 | A | | 12/2000 | You et al. | |
| 6,928,216 | B2 | | 8/2005 | Murali et al. | |
| 9,423,561 | B1 | * | 8/2016 | Chou | G02B 6/30 |
| 9,995,881 | B1 | * | 6/2018 | Patel | G02B 6/30 |

OTHER PUBLICATIONS

U.S. Appl. No. 15/797,355, Butler et al. "Fiber Array Assemblies for Multifiber Connectorized Ribbon Cables and Methods of Forming Same", filed Oct. 30, 2017, 33 pgs.
International Application No. PCT/US18/21000, Mattis et al, "Universal Photonic Adaptor for Coupling an Optical Connector to an Optoelectronic Substrate", filed Mar. 6, 2018, 34 pgs.

* cited by examiner

*Primary Examiner* — Jerry Rahll
(74) *Attorney, Agent, or Firm* — Adam R. Weeks

(57) ABSTRACT

Disclosed herein is a fiber optic-to-waveguide coupling assembly with an overlap for edge coupling. The fiber optic-to-waveguide coupling assembly includes a first coupler having a substrate and at least one data fiber, and an interposer with at least one waveguide. A first coupler overlap portion of the substrate is positionable proximate a first interposer overlap portion of the interposer to form a first overlap therebetween to align the at least one data fiber with the at least one waveguide. The substrate and the interposer may each include complementary alignment features to further align the at least one data fiber and the at least one waveguide. The fiber optic-to-waveguide coupling assembly provides simple and accurate alignment with simplified manufacture and assembly.

25 Claims, 9 Drawing Sheets

FIBER OPTIC-TO-WAVEGUIDE COUPLING ASSEMBLY WITH OVERLAP FOR EDGE COUPLING

CROSS REFERENCE TO RELATED APPLICATIONS

This application claims the benefit of priority of U.S. Provisional Application Ser. No. 62/641,516, filed on Mar. 12, 2018, the content of which is relied upon and incorporated herein by reference in its entirety.

BACKGROUND

The disclosure relates to optical coupling, such as among an array of fibers and an array of waveguides within a waveguide circuit, e.g., a planar lightwave circuit (PLC) and/or photonic integrated circuit (PIC) (e.g., silicon photonic circuit). In particular, this disclosure relates to a fiber optic-to-waveguide coupling assembly including an interposer evanescently coupled to a waveguide circuit and edge coupled to optical fibers of a fiber array unit (FAU).

FIG. 1A is a perspective view of a fiber-to-waveguide coupling system 100 (e.g., planar lightwave circuit (PLC) assembly) including a fiber array unit coupler 102 (e.g., FAU coupler) of a fiber array unit 104 and a waveguide coupler 106 of a waveguide assembly 108. The fiber array unit coupler 102 includes a plurality of optical fibers 110 with end faces 112. The waveguide coupler 106 includes a plurality of waveguides 114 with end faces 116. When the fiber array unit coupler 102 is engaged with the waveguide coupler 106, the end faces 112 of the optical fibers 110 are in contact with (or closely proximate to) and aligned with the end faces 116 of the waveguides 114. In this way, the optical fibers 110 and the waveguides 114 are edge coupled permitting optical communication between the fiber array unit 104 and a waveguide circuit 115 of the waveguide assembly 108.

Edge coupling between the optical fibers 110 and the waveguides 114 may require an optical quality edge on the waveguide circuit 115, which adds manufacturing cost and process complexity. Such a configuration may also require precise alignment between the optical fibers 110 and the waveguides 114, which may be difficult, time consuming and/or expensive. Achieving precise alignment may require complex manufacturing processes and/or components which are not compatible with standard electronic integrated circuit assembly processes, such as high throughput pick and place machines used to place surface mount devices onto a printed circuit board (PCB).

FIG. 1B is a cross-sectional view of another fiber-to-waveguide coupling system 100' for edge coupling. The fiber-to-waveguide coupling system 100' includes a planar waveguide array 108' of an interposer 106' that is intermediate and positioned between a waveguide circuit 115' and a plurality of optical fibers 110' of a fiber array unit (FAU) coupler 102'. The interposer 106' is positioned to edge couple light to or from optical fibers 110' of the FAU coupler 102'. The fiber-to-waveguide coupling system 100' avoids the need for an optical quality edge for the waveguide circuit 115' and allows for surface mounting of the interposer 106', but still requires actively aligning the FAU coupler 102' to waveguides 118' of the interposer 106' using all six translational and rotational degrees of freedom. Attempts to simplify this complex alignment process and reduce the number of degrees of freedom for highly precise passive alignment may require complicated manufacturing steps. For example, the use of complementary insertion pins and receptacles in a male-female relationship may align the FAU coupler 102' and the waveguide coupler 106', but manufacturing of couplers with such insertion pins requires specific relative sizing and placement (using all six translational and rotational degrees of freedom). This may be further complicated when formation of corresponding alignment features requires precise manufacturing of very different materials and different manufacturing processes between respective couplers.

While passive alignment freedom leads to faster, lower cost integrated photonic packages, what is needed is a simple fabrication and assembly compatible with existing processes.

No admission is made that any reference cited herein constitutes prior art. Applicant expressly reserves the right to challenge the accuracy and pertinency of any cited documents.

SUMMARY

Disclosed herein is a fiber optic-to-waveguide coupling assembly with an overlap for edge coupling. In particular, disclosed is a fiber optic-to-waveguide coupling assembly with an interposer having an intermediate waveguide for evanescent coupling to waveguides (e.g., planar waveguides) within a waveguide circuit (e.g., planar lightwave circuit (PLC) and/or photonic integrated circuit (PIC) (e.g., silicon photonic circuit)) and edge coupling to optical fibers of a fiber array unit. The fiber optic-to-waveguide coupling assembly includes an interposer and a first coupler and/or a second coupler. The first coupler includes a substrate and at least one data fiber. The interposer includes at least one waveguide. An x axis is perpendicular to the at least one data fiber, the at least one waveguide of the interposer, and a y axis. A first coupler overlap portion of the substrate is positionable proximate a first interposer overlap portion of the interposer to form a first overlap therebetween to align the at least one data fiber of the first coupler with the at least one waveguide of the interposer in a y direction along the y axis intersecting the substrate and the interposer. The substrate and the interposer may each include complementary alignment features (e.g., optical and/or mechanical, etc.) to further align the at least one data fiber and the at least one waveguide in an x direction along the x axis, in a z direction along the z axis, and/or around the y axis (i.e., rotation). These complementary alignment features may be made using the same relative manufacturing processes used to create the substrate and/or interposer. The fiber optic-to-waveguide coupling assembly provides simple and accurate passive alignment of the at least one data fiber with the at least one waveguide with simplified manufacture and assembly.

One embodiment of the disclosure relates to a fiber optic-to-waveguide coupling assembly. The fiber optic-to-waveguide coupling assembly includes a first coupler and an interposer. The first coupler includes a first substrate with a first surface, and at least one data fiber positioned proximate the first surface. The interposer includes a second surface, and at least one waveguide positioned proximate the second surface. An x axis is perpendicular to the at least one data fiber, the at least one waveguide, and a y axis. A first coupler overlap portion of the first substrate of the first coupler is positionable proximate a first interposer overlap portion of the interposer to form a first overlap therebetween to align the at least one data fiber of the first coupler with the at least one waveguide of the interposer in a y direction along the y axis intersecting the first surface of the first substrate and the second surface of the interposer.

An additional embodiment of the disclosure relates to a fiber optic-to-waveguide coupling system. The fiber optic-to-waveguide coupling system includes a first coupler, a second coupler, and an interposer. The first coupler includes a first substrate and a fiber array. The first substrate includes a first plurality of mounting grooves defined in a first surface. The fiber array includes a plurality of data fibers. Each of the plurality of data fibers is positioned in one of the first plurality of mounting grooves of the first substrate. The interposer is edge coupled to the first coupler and evanescently coupled to the second coupler. The interposer includes a plurality of waveguides and a plurality of waveguide channels defined in a second surface. Each of the plurality of waveguides is positioned in one of the plurality of waveguide channels. An x axis is perpendicular to at least one of the plurality of data fibers, at least one of the plurality of waveguides, and a y axis. At least a portion of the first surface of the first substrate of the first coupler is positionable proximate at least a portion of the second surface of the interposer to form a first overlap therebetween to align at least one data fiber of the first coupler with at least one of the plurality of waveguides of the interposer in a y direction along the y axis intersecting the first surface of the first substrate and the second surface of the interposer. At least a portion of the second coupler is positionable proximate at least a portion of the second surface of the interposer to form a second overlap therebetween to evanescently couple the interposer and the second coupler.

An additional embodiment of the disclosure relates to a method of manufacturing a fiber optic-to-waveguide coupling assembly. The method includes positioning at least one data fiber proximate a first surface of a first substrate of a first coupler. The method further includes positioning at least one waveguide proximate a second surface of an interposer. The method further includes aligning the at least one data fiber of the first coupler with the at least one waveguide of the interposer in a y direction along a y axis intersecting the first surface of the first substrate and the second surface of the interposer by positioning at least a portion of the first surface of the first substrate of the first coupler proximate at least a portion of the second surface of the interposer to form a first overlap therebetween. The method further includes aligning the at least one data fiber of the first coupler with the at least one waveguide of the interposer in an x direction along an x axis perpendicular to the at least one data fiber, the at least one waveguide, and the y axis.

Additional features and advantages will be set forth in the detailed description which follows, and in part will be readily apparent to those skilled in the art from that description or recognized by practicing the embodiments as described herein, including the detailed description which follows, the claims, as well as the accompanying drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
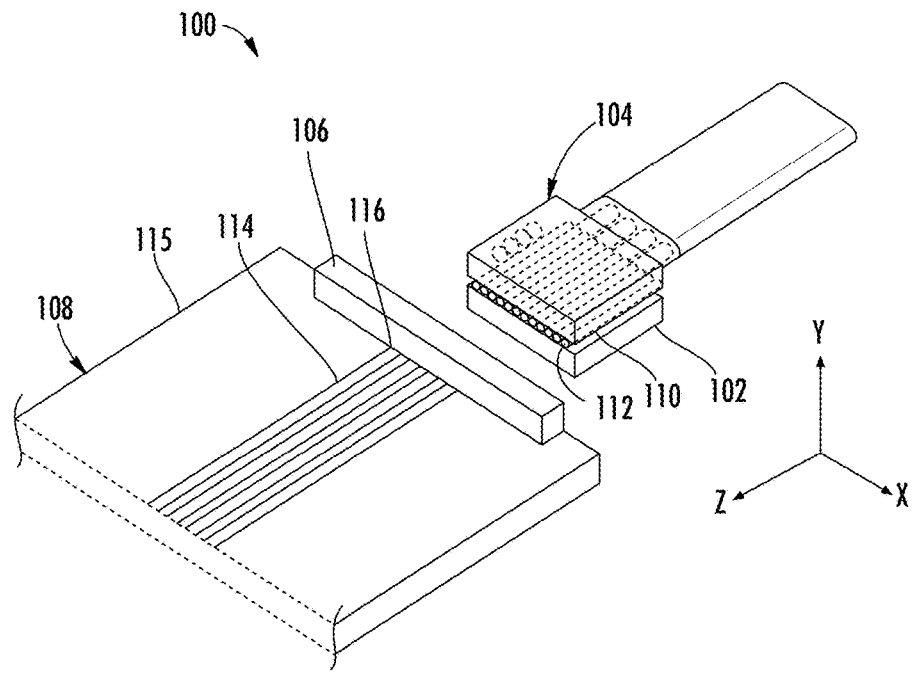
FIG. 1A is a perspective view of a fiber-to-waveguide coupling system including a fiber array unit coupler and a waveguide coupler.
Figure 1B:
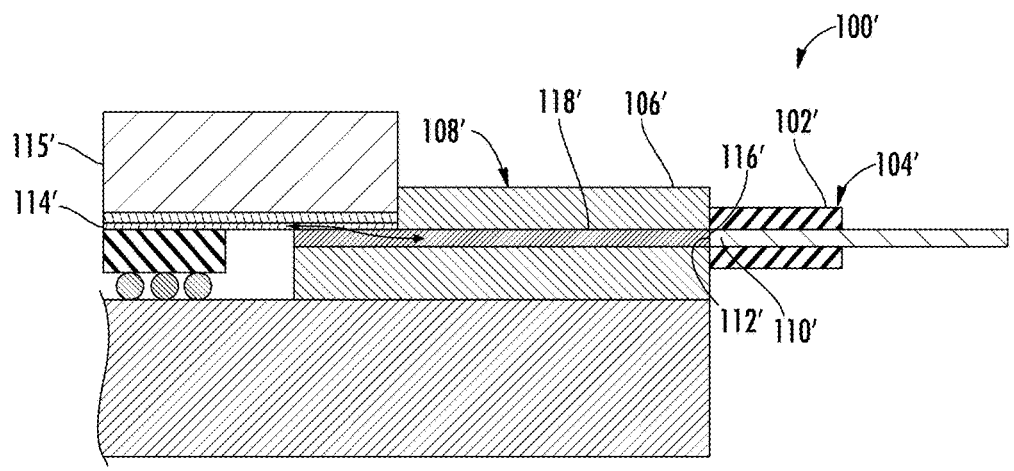
FIG. 1B is a cross-sectional view of another fiber-to-waveguide coupling system with an intermediate waveguide for evanescent coupling to waveguides within a waveguide circuit and edge coupling to a fiber array unit.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

As used herein, the terms "optical communication," "in optical communication," and the like mean, with respect to a group of elements, that the elements are arranged such that optical signals are passively or actively transmittable therebetween via a medium, such as, but not limited to, an optical fiber, one or more ports, free space, index-matching material (e.g., structure or gel), reflective surface, or other light directing or transmitting means.

As used herein, it is intended that terms "fiber optic cables" and/or "optical fibers" include all types of single mode and multi-mode light waveguides, including one or more optical fibers that may be coated, uncoated, colored, buffered, ribbonized and/or have other organizing or protective structure in a cable such as one or more tubes, strength members, jackets or the like.

As used herein, the term "signal" refers to modulated or unmodulated light intended to be transmitted or received at a device.

As used herein, the term "data fiber" refers to any type of optical fiber for propagating a modulated signal.

As used herein, the term "coupler" refer to a device for connecting light from one device to another. A coupler need not be permanently attached and may be removable.

Disclosed herein is a fiber optic-to-waveguide coupling assembly with an overlap for edge coupling. In particular, disclosed is a fiber optic-to-waveguide coupling assembly with an interposer having an intermediate waveguide for evanescent coupling to waveguides (e.g., planar waveguides) within a waveguide circuit (e.g., planar lightwave circuit (PLC) and/or photonic integrated circuit (PIC) (e.g., silicon photonic circuit)) and edge coupling to optical fibers of a fiber array unit. The fiber optic-to-waveguide coupling assembly includes an interposer, a first coupler, and, in some embodiments, a second coupler. The first coupler includes a substrate and at least one data fiber. The interposer includes at least one waveguide. An x axis is perpendicular to the at least one data fiber, the at least one waveguide of the interposer, and a y axis. A first coupler overlap portion of the substrate is positionable proximate a first interposer overlap portion of the interposer to form a first overlap therebetween to align the at least one data fiber of the first coupler with the at least one waveguide of the interposer in a y direction along the y axis intersecting the substrate and the interposer. The substrate and the interposer may each include complementary alignment features (e.g., optical and/or mechanical, etc.) to further align the at least one data fiber and the at least one waveguide in an x direction along the x axis, in a z direction along the z axis, and/or around the y axis (i.e., rotation). These complementary alignment features may be made using similar manufacturing processes used to create the substrate and/or interposer. The fiber optic-to-waveguide coupling assembly provides simple and accurate passive alignment of the at least one data fiber with the at least one waveguide.

Figure 2A:
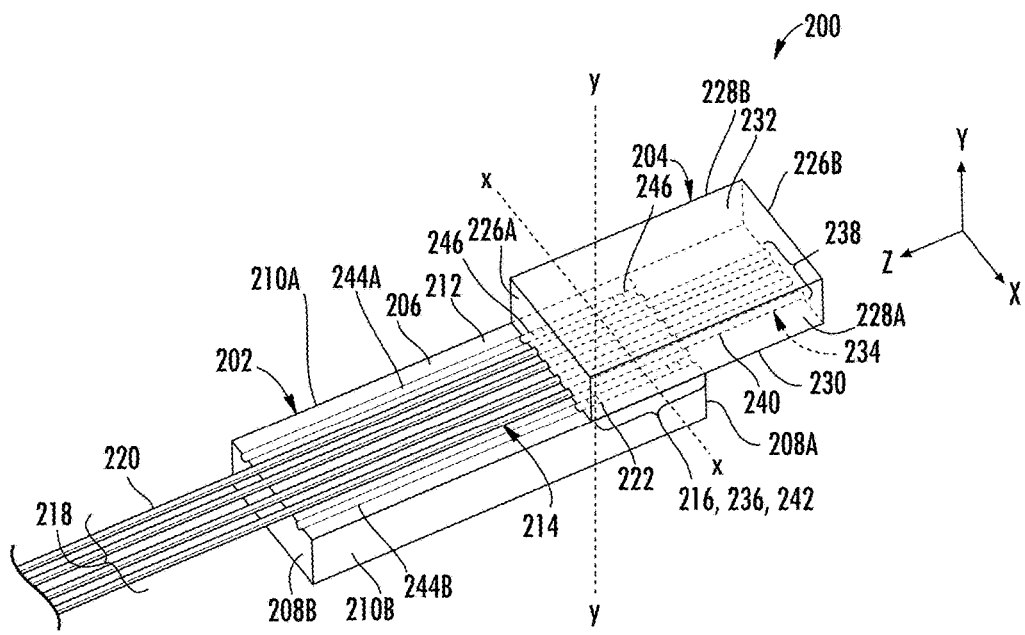
FIG. 2A is a perspective view of an exemplary embodiment of a fiber optic-to-waveguide coupling assembly with an overlap for edge coupling, the fiber optic-to-waveguide coupling assembly including a first coupler and an interposer.
Figure 2B:
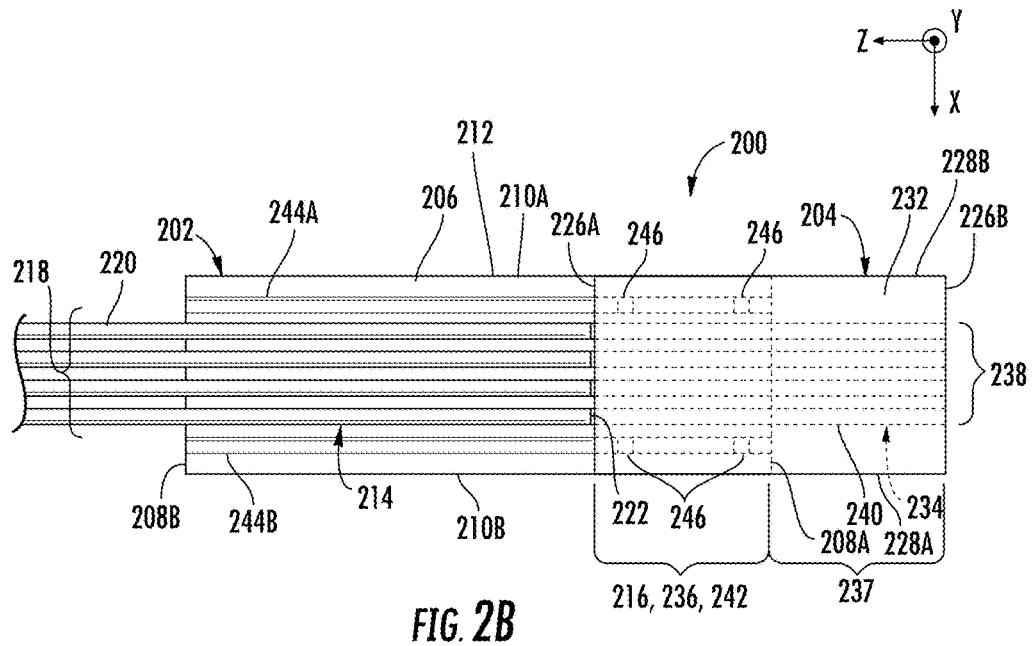
FIG. 2B is a top view of the fiber optic-to-waveguide coupling assembly of FIG. 2A.

FIGS. 2A and 2B are views of an exemplary embodiment of a fiber optic-to-waveguide coupling assembly 200 (e.g., fiber array unit (FAU)-to-planar waveguide passive alignment assembly) with an overlap for edge coupling. In particular, the fiber optic coupling assembly 200 includes a first coupler 202 (e.g., fiber array unit coupler, fiber optic coupler, etc.) and an interposer 204. The fiber optic coupling assembly 200 provides for a simple and effective way to decrease the number of degrees of freedom for passive alignment between the first coupler 202 and the interposer 204.

The first coupler 202 includes a first substrate 206 with a first end 208A, a second end 208B (opposite the first end 208A), a first side 210A, a second side 210B (opposite the first side 210A), and a first surface 212 (e.g., top surface). In certain embodiments, the first surface 212 is planar and may define a plurality of mounting grooves 214 (e.g., V-grooves) in the first surface 212 extending at least partially (e.g., partially or fully) between the first end 208A and the second end 208B. In the embodiment illustrated in FIGS. 2A and 2B, for example, the mounting grooves 214 extend from the first end 208A to the second end 208B (i.e., along the entire length of the first substrate 206), however, in other embodiments, the fiber V-grooves extend only partially along the first substrate 206. The first substrate 206 includes a first coupler overlap portion 216 defined near the first end 208A of the first substrate 206 for alignment with the interposer 204.

The first coupler 202 also includes a fiber array 218 including a plurality of data fibers 220 positioned proximate the first surface 212. In particular, each of the plurality of data fibers 220 is positioned in (e.g., mounted within) one of the plurality of mounting grooves 214. End faces 222 (e.g. cleaved fiber ends) are positioned between the first end 208A and the second end 208B along the length of the mounting grooves 214 instead of being positioned at the edge of the first substrate 206. The plurality of data fibers 220 extend from the second end 208B toward the first end 208A and, in certain embodiments, the data fibers 220 do not extend into the first coupler overlap portion 216 of the first substrate 206 of the first coupler 202. As illustrated in FIG. 2B, the end faces 222 of the data fibers 220 may be spaced slightly apart from the first end 226A of the interposer 204. In other embodiments, the end faces 222 of the data fibers 220 are in contact with or directly adjacent to the first end 226A of the interposer 204.

The interposer 204 (may also be referred to as an ion-exchange waveguide interposer, second substrate, etc.) includes a first end 226A, a second end 226B (opposite the first end 226A), a first side 228A, a second side 228B (opposite the first side 228A), a second surface 230 (e.g., bottom surface) and a top surface 232 (opposite the bottom surface). In certain embodiments, the second surface 230 is planar and defines a plurality of waveguide channels 234 (e.g., V-grooves) extending at least partially (e.g., partially or fully) between the first end 226A and the second end 226B. In certain embodiments, the plurality of waveguide channels 234 may be defined by a photolithographic process, such as ultraviolet exposure and development of photoresist. In this way, the plurality of waveguide channels 234 may be formed by a transformation of a portion of the interposer 204 rather than removal of material from the interposer 204. In certain embodiments, that transformation can occur through an ion-exchange process. The interposer 204 includes a first interposer overlap portion 236 defined at the first end 226A of the interposer 204 and a second interposer overlap portion 237 defined at the second end 226B of the interposer 204.

The interposer 204 further includes a waveguide array 238 including a plurality of waveguides 240 (e.g., planar waveguides, silicon waveguides, polymer waveguides, glass waveguides, ion-exchange glass waveguides, etc.). In some embodiments, the waveguides 240 are made of glass (i.e., glass waveguides). Each of the waveguides 240 is positioned in (e.g., defined in) one of the plurality of waveguide channels 234. In certain embodiments, the waveguides 240 are defined by a photolithographic process and thereby formed, defined, and positioned within the waveguide channels 234. The waveguides 240 extend from the first end 226A to the second end 226B such that the waveguides 240 extend into the first interposer overlap portion 236 of the interposer 204 and into a second interposer overlap portion 237. As explained in more detail below, the second interposer overlap portion 237 of the interposer 204 provides an area for evanescent coupling of the waveguides 240 to waveguides of a waveguide circuit (e.g., silicon inverse-taper waveguides) of a second coupler.

In the embodiments illustrated in FIGS. 2A and 2B, the x axis is perpendicular to the data fibers 220, the waveguides 240, and a y axis. In other words, the x axis extends through the first side 210A and the second side 210B of the first substrate 206 and/or through the first side 228A and the second side 228B of the interposer 204. The y axis is perpendicular the data fibers 220 and the waveguides 240. Further, the y axis intersects the first surface 212 of the first substrate 206 and the second surface 230 of the interposer 204. A z axis is aligned with or parallel to the data fibers 220 and the waveguides 240, and perpendicular to the x axis and the y axis.

In general, there are six degrees of freedom for aligning two objects in space: translation along the x axis, y axis, and z axis, as well as rotation around the x axis (i.e., pitch, tip, etc.), rotation around the y axis (i.e., yaw, etc.), and rotation around the z axis (i.e., roll, tilt, etc.). The mechanical features and/or visual aids provided by the fiber optic-to-waveguide coupling assembly 200 reduce the number of degrees of freedom between the first coupler 202 and the interposer 204, thereby making it easier to align the first coupler 202 of a fiber array unit to the interposer 204. For example, as explained below in more detail, the first surface 212 of the first coupler 202 of the fiber array unit constrains the interposer 204 in the y-direction, rotation about the x axis, and/or rotation about the z axis. The end faces 222 of the data fibers 220 constrain the interposer 204 in the z-direction and/or rotation about the y axis. It is noted that alignment along and about the x axis and y axis may require greater precision (e.g., within 5 microns, preferably within 1 micron, etc.) than alignment along and about the z axis (e.g., within 10 microns).

The first coupler overlap portion 216 of the first substrate 206 of the first coupler 202 is positionable proximate the first interposer overlap portion 236 of the interposer 204 to form a first overlap 242 therebetween. Further, the y axis intersects the first surface 212 of the first substrate 206 and the second surface 230 of the interposer 204 at the first overlap 242. This first overlap 242 aligns the data fibers 220 of the first coupler 202 with the waveguides 240 of the interposer 204 in one or more directions. In particular, the first overlap 242 aligns the data fibers 220 and the waveguides 240 in a y direction along the y axis (i.e., alignment is within a plane defined by the x and z axes) by the first surface 212 of the first substrate 206 contacting (directly or indirectly) the second surface 230 of the interposer 204. Because the first surface 212 of the first substrate 206 and the second surface 230 of the interposer 204 are planar, contacting the first surface 212 and the second surface 230 would further align the data fiber 220 with the waveguides 240 around the x-axis (i.e., tip) and/or around a z-axis (i.e., tilt). As shown in FIGS. 2A and 2B, the data fibers 220 do not extend into the first overlap 242 but the waveguides 240 do extends into the first overlap 242.

The remaining degrees of freedom to align the data fibers 220 with the waveguides 240 include alignment by translation in an x direction along the x axis, alignment by rotation about the y axis, and/or alignment by translation in a z direction along the z axis. In certain embodiments, alignment of the first data fibers 220 with the waveguides 240 by translation in the z direction along the z axis and/or alignment by rotation about the y-axis may be achieved by translating the interposer 204 toward the second end 208B of the first substrate 206, until the first end 226A of the interposer 204 abuts the end faces 222 of the data fibers 220. In other words, the degrees of freedom may be constrained by aligning the end faces 222 of the data fibers 220 with the first end 226A of the interposer 204. Additionally, or alternatively, in certain embodiments, the first substrate 206 and the interposer 204 may include one or more complementary alignment features to passively align in an x direction along the x axis and/or rotationally around the y axis.

As shown in FIGS. 2A and 2B, in one embodiment, the first substrate 206 defines a first substrate alignment groove 244A in the first surface 212 (disposed toward the first side 210A and positioned between the first side 210A and the mounting grooves 214), and a second substrate alignment groove 244B (disposed toward the second side 210B and positioned between the second side 210B and the mounting grooves 214). Thus, the first substrate alignment groove 244A and the second substrate alignment groove 244B (referred to generally as substrate alignment grooves 244) are adjacent the mounting grooves 214. In particular, at least a portion of the substrate alignment grooves 244 is provided in the first coupler overlap portion 216 toward the first end 208A of the first substrate 206. The same manufacturing processes that are used to manufacture the mounting grooves 214 could also be used to manufacture the substrate alignment grooves 244 for increased precision and reduced complexity. For example, one such manufacturing process includes machining glass with a diamond wheel (e.g., using a CNC machine). In this way, in certain embodiments, spacing between adjacent mounting grooves 214 (also called evenly-spaced mounting grooves) is the same (i.e., plus or minus 1 micron) as spacing between the substrate alignment grooves 244 and the adjacent mounting grooves 214 (to simplify manufacturing thereof). In certain embodiments, the substrate alignment grooves 244 have a same depth as the mounting grooves 214 (to simplify manufacturing thereof), and in other embodiments the substrate alignment grooves 244 may have a different depth. For example, in certain embodiments the substrate alignment grooves 244 may have a greater depth to accommodate an alignment cylinder, as discussed in more detail below. Thus, the substrate alignment grooves 244 are used as the fiducials since they can be precisely located with respect to the mounting grooves 214.

The interposer 204 may include a material that is transparent to visible light (e.g., glass). Further, the interposer 204 may include interposer alignment fiducials 246 on the second surface 230 of the interposer 204. In particular, the interposer alignment fiducials 246 are provided in the first interposer overlap portion 236 toward the first end 226A of the interposer 204. The interposer alignment fiducial 246 may be additive (e.g., extending from the second surface 230) or subtractive (e.g., cutting into the second surface 230). For example, the interposer alignment fiducials 246 may be photolithographically defined (i.e., made by photolithography). In certain embodiments, for alignment with the first substrate 206, the second surface 230 of the interposer 204 has photolithographically-defined fiducials and/or photolithographically-defined etched grooves adjacent to the waveguides 240 with the same spacing as the substrate alignment grooves 244.

The interposer alignment fiducial 246 may be any of a variety of shapes (e.g., dot, circle, triangle, square, etc.) and sizes. In some embodiments, for example, the interposer alignment fiducials 246 need only be a line that, when aligned with the edge or bottom of the V-groove, defines the lateral translation (e.g., along the x-axis) and/or in-plane rotation (e.g., about the y-axis) needed to align the data fibers 220 to the waveguides 240. The same manufacturing processes that are used to manufacture the waveguides 240 could also be used to manufacture the interposer alignment fiducials 246 for increased precision and reduced complexity. Fiducials typically are intended to align with other fiducials (e.g., photolithographically created fiducials may need registration with respect to other photolithographically-defined features), and here the waveguides 240 (e.g., ion-exchange waveguides) of the interposer 204 are fabricated after a photolithographically-defined photomask defines openings for the silver in a salt bath to exchange with sodium in the glass.

The interposer alignment fiducial 246 is configured to cooperate with the substrate alignment groove 244 to align the data fiber 220 of the first coupler 202 with the waveguides 240 of the interposer 204 in an x direction along the x axis and/or rotationally around the y axis. For example, the interposer alignment fiducials 246 are positioned on the second surface 230 of the interposer 204 to align with the substrate alignment grooves 244. In particular, the interposer alignment fiducial 246 is a square shape and the width of the square is generally the same width as that of the substrate alignment groove 244. By looking at the interposer alignment fiducial 246 and the substrate alignment grooves 244 through the transparent interposer 204, the square shape of the interposer alignment fiducial 246 and the substrate alignment grooves 244 could be used to orient the interposer 204 relative to the first substrate 206 in an x direction along the x axis and/or rotationally around the y axis. In this way, the mechanical substrate alignment grooves 244 and optical interposer alignment fiducials 246 are used for visual, passive alignment of the vertically-placed interposer 204.

It is noted that in certain embodiments, only a point of the interposer alignment fiducial 246 is configured to align with only a point of the substrate alignment grooves 244 to orient the interposer 204 relative to the first substrate 206 in an x direction along the x axis. Further, although only one of the interposer alignment fiducials 246 and/or only one of the substrate alignment grooves 244 is needed for alignment, multiples can be provided to further facilitate alignment and alignment accuracy.

Once assembled, the mounting grooves 214 underneath the waveguides 240 may be either left open or filled with adhesive. If exposure to air is a concern, epoxy can be placed along the edges of the first coupler overlap portion 216 (e.g., proximate the first side 228A and/or the second side 228B) but not underneath the entire length of the waveguides 240. The positioning of the data fibers 220 and waveguides 240 is designed to align for maximum coupling of light therebetween. In certain embodiments, index matching material may be applied between the end faces 222 of the data fibers 220 and the waveguides 240 of the interposer 204.

Advantages may include cost savings as there may be no additional alignment parts (at least by using fiducials) and may be a reduction in assembly steps (e.g., FAU polishing) and assembly time by elimination alignment steps. Further, other advantages may include more mechanically robust configurations since an interposer 204 may be positioned on top of the first coupler 202 rather than in front of it (e.g., larger bond area). Larger, unobstructed bond areas may make it easier to use laser bonding, which can provide higher processing temperature and operating temperature performance and less movement of parts when bonded. In certain embodiments, higher processing temperature means that the assembly 200 can survive solder reflow temperature cycling in the attachment of electronic integrated circuits (ICs) via a surface-mounted/ball-grid-array process.

Figure 3:
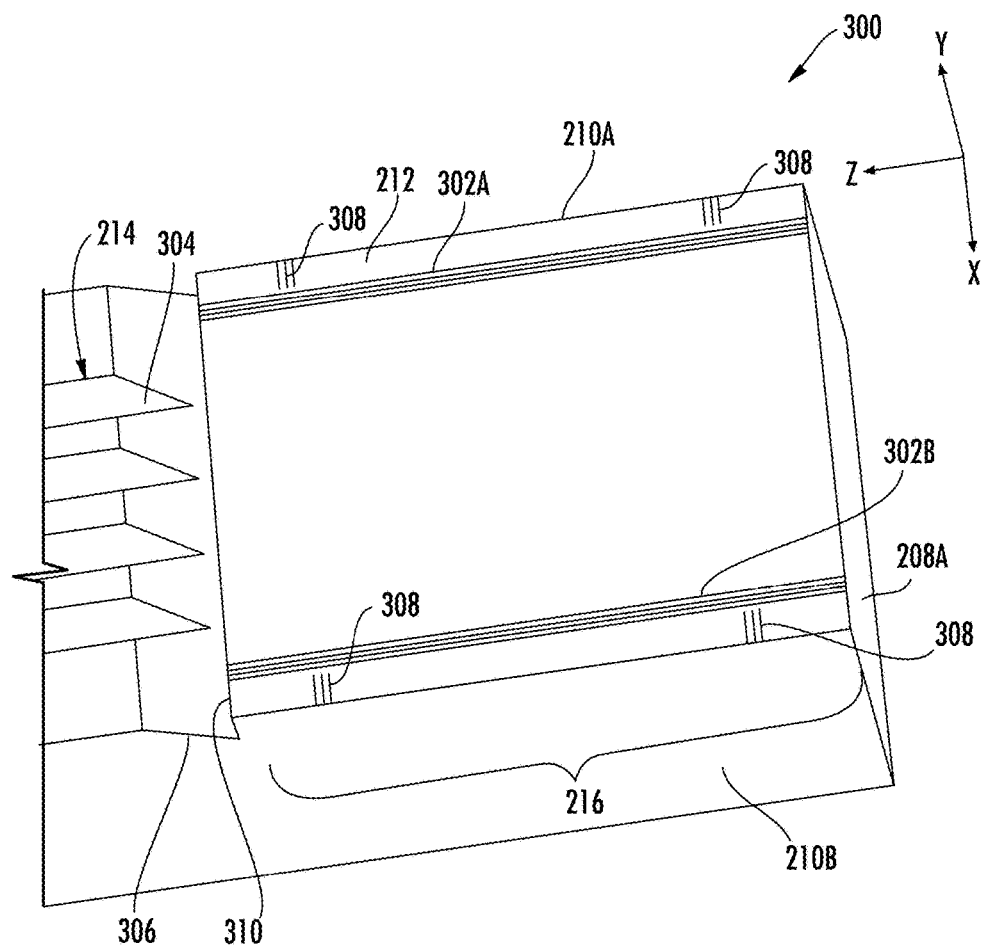
FIG. 3 is a perspective view another exemplary embodiment of the first substrate of the first coupler of FIGS. 2A and 2B with substrate alignment fiducials and mounting grooves terminated within the first substrate.

FIG. 3 is a perspective view another exemplary embodiment of a first substrate 300 of the first coupler 202 of FIGS. 2A and 2B with substrate alignment fiducials 302A, 302B, 308 and mounting grooves 214 terminated within the first substrate 300. In other words, the mounting grooves 214 (e.g., fiber V-grooves) terminate part way through the first substrate 300 and/or do not extend into the first coupler overlap portion 216. In particular, the first substrate 300 defines a first substrate longitudinal alignment fiducial 302A and a second substrate longitudinal alignment fiducial 302B (may be referred to generally as substrate longitudinal alignment fiducials 302) defined (e.g., cut) in the first surface 212 within the first coupler overlap portion 216. The mounting grooves 214 include a termination end 304 offset from the first end 208A of the first substrate 300, formed by a trench 306 formed in the first surface 212 of the first substrate 206 proximate the first coupler overlap portion 216 and extending between the first side 210A and the second side 210B. In other words, the mounting grooves 214 terminate at the trench 306 that is transverse (e.g., perpendicular) to the mounting grooves 214. In this way, the mounting grooves 214 do not extend into the first coupler overlap portion 216 and there is no gap or open space beneath the waveguides 240 of the interposer 204, which can avoid adhesive from causing additional propagation loss due to proximity of the waveguides 240. The trench 306 can be parallel to the x-axis and/or perpendicular to the substrate longitudinal alignment fiducials 302.

In use, the first end 226A of the interposer 204 (see FIGS. 2A and 2B) is positioned proximate a termination end 304 of the mounting grooves 214 so that the end faces 222 of the data fibers 220 (see FIGS. 2A and 2B) can be proximate to the waveguides 240 (see FIGS. 2A and 2B) for efficient optical coupling. The substrate alignment fiducials 302 may be created by the same cutting tool used for forming the mounting grooves 214 and may be less deep. Further, the part or cutting tool may be rotated to create substrate orthogonal alignment fiducials 308 to align the first coupler 202 and the interposer 204 (see FIGS. 2A and 2B) in the z direction along the y axis and/or to create the trench 306.

In certain embodiments, the trench 306 in the termination region defines a 90 degree edge 310 opposite the mounting grooves 214, which can be used as a mechanical stop for the data fibers 220 (see FIGS. 2A and 2B). The fiducials 302, 308 may be shallower than the mounting grooves 214. Since the fiducials 302, 308 are cut using the same tool and preferably without moving the part, their location with respect to the mounting grooves 214 may be highly precise.

Figure 4A:
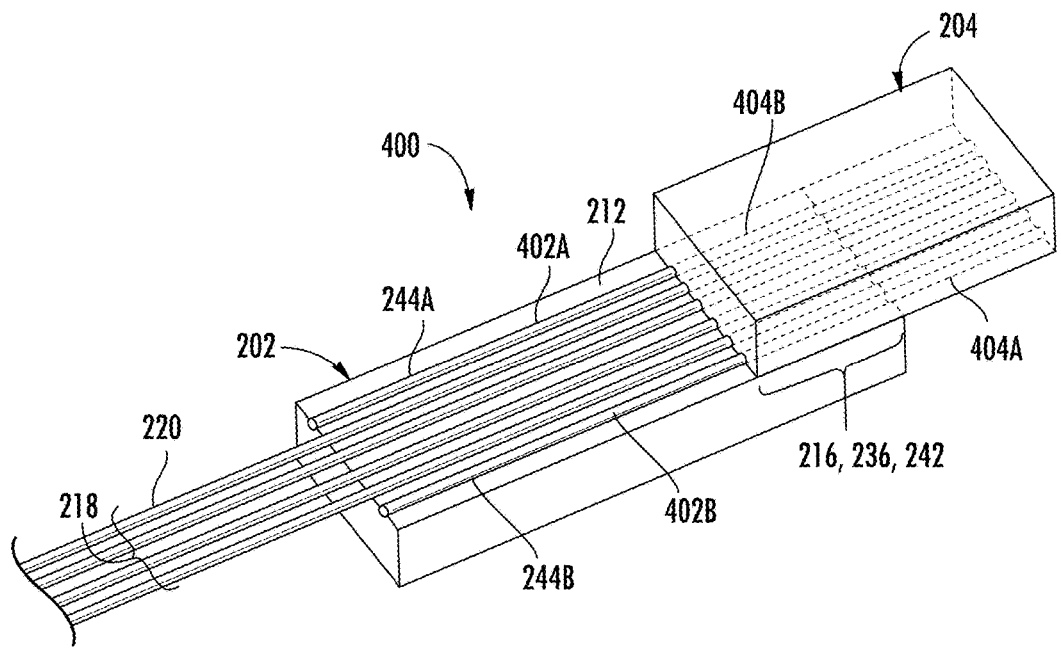
FIG. 4A is a perspective view of another exemplary embodiment of the fiber optic-to-waveguide coupling assembly of FIGS. 2A and 2B including alignment cylinders.
Figure 4B:
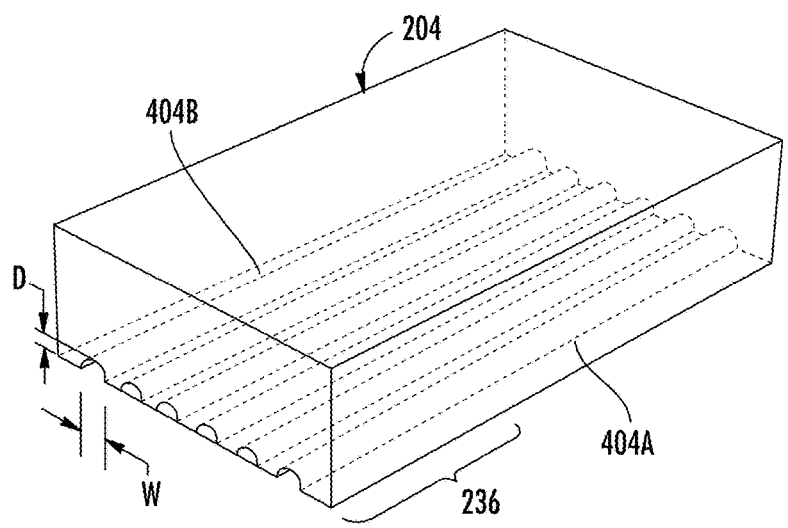
FIG. 4B is a perspective view of the interposer of the fiber optic-to-waveguide coupling assembly of FIG. 4A including interposer alignment grooves.

FIGS. 4A and 4B are perspective views of another exemplary embodiment of a fiber optic-to-waveguide coupling assembly 400 including alignment cylinders 402 and interposer alignment grooves 404A and 404B. In particular, the first coupler 202 includes a first alignment cylinder 402A positioned in the first substrate alignment groove 244A and a second alignment cylinder 402B (may also be referred to generally as alignment cylinders 402) positioned in the second substrate alignment groove 244B. In certain embodiments, the alignment cylinder 402 includes a non-data optical fiber that has a same diameter as the at least one data fiber. The alignment cylinder 402 extends toward the interposer 204 beyond the data fiber 220 into the first coupler overlap portion 216.

In certain embodiments, the alignment cylinders 402 (may also be referred to as alignment pins) are made from non-active fibers (may also be referred to as dummy fibers) of the same fiber ribbon as the data fibers 220 (may also be referred to as signal fibers) and have the same diameter as the data fibers 220, but may be cleaved to extend beyond the ends of the data fibers 220 into the first coupler overlap portion 216 (and/or not extending beyond the first end 208A of the first substrate 206). This can be achieved by cleaving the two outermost fibers of the ribbon to a longer length than the signal fibers.

The interposer 204 defines a first interposer alignment groove 404A and a second interposer alignment groove 404B (may be referred to generally as interposer alignment grooves 404). The interposer alignment grooves 404 are configured to receive at least a portion of the alignment cylinder 402 to align the data fibers 220 of the first coupler 202 with the waveguides 240 of the interposer 204 in an x direction along the x axis and/or rotationally around the y axis. A depth D of the interposer alignment grooves 404 (along the y axis) may be larger than a width W along the x axis of the interposer alignment grooves 404 because the interposer alignment grooves 404 are used for alignment along the x axis and/or rotationally around the y axis, not for alignment along the y axis. As a result, the width W is more precisely defined than the depth D. Instead of alignment fiducials within the photomask of the interposer 204, the photomask defines an opening for subsequent chemical or physical etching of the interposer alignment grooves 404. Given the isotropic nature of etching glass, the interposer alignment grooves 404 may be rectangular at the top and have slightly rounded bottoms. In certain embodiments, alignment cylinder 402 is partially positioned in both the substrate alignment groove 244 and the interposer alignment grooves 404. In other words, the top part of the alignment cylinder 402 fits within the interposer alignment grooves 404 while the bottom part of the alignment cylinder 402 fits within the substrate alignment groove 244 of the first coupler 202.

The interposer alignment grooves 404 can be at the same or different depth, but in certain embodiments may be deeper if the alignment cylinder 402 has a larger diameter so that the alignment cylinder 402 does not interfere with alignment in the y direction along the y axis between the data fibers 220 and the waveguides 240. Accordingly, the interposer alignment grooves 404 are configured to receive at least a portion of the alignment cylinder 402 to align the at least one data fiber 220 of the first coupler 202 with the at least one waveguide 240 of the interposer 204 in an x direction along the x axis and/or rotationally around the y axis.

The alignment cylinder 402 may reduce the assembly complexity as there is no need for vision-based alignment. Once the data fibers 220 and alignment cylinder 402 are bonded to the first substrate 206, the interposer 204 can be placed onto the first surface 212 of the first substrate 206 and can slide against the data fibers 220 before bonding, thereby simplifying assembly. Alternatively, the interposer 204 can be bonded first and the data fibers 220 slide against the interposer 204.

In certain embodiments, the substrate alignment grooves 244 have the same diameter as the mounting grooves 214. In other embodiments, the substrate alignment grooves 244 have a depth greater than the depth of the mounting grooves 214. In such embodiments, the substrate alignment grooves 244 are greater (i.e., have a greater depth) than the mounting grooves 214 and are configured such that the top surface of the data fibers 220 in the mounting grooves 214 is in the same plane as the alignment cylinders 402 positioned in the substrate alignment grooves 244. In such a configuration, the interposer alignment grooves 404 do not need to be made deeper to accommodate the larger diameter of the alignment cylinders 402, which simplifies the process and the amount of etching that may be required to form the interposer alignment grooves 404.

Figure 5:
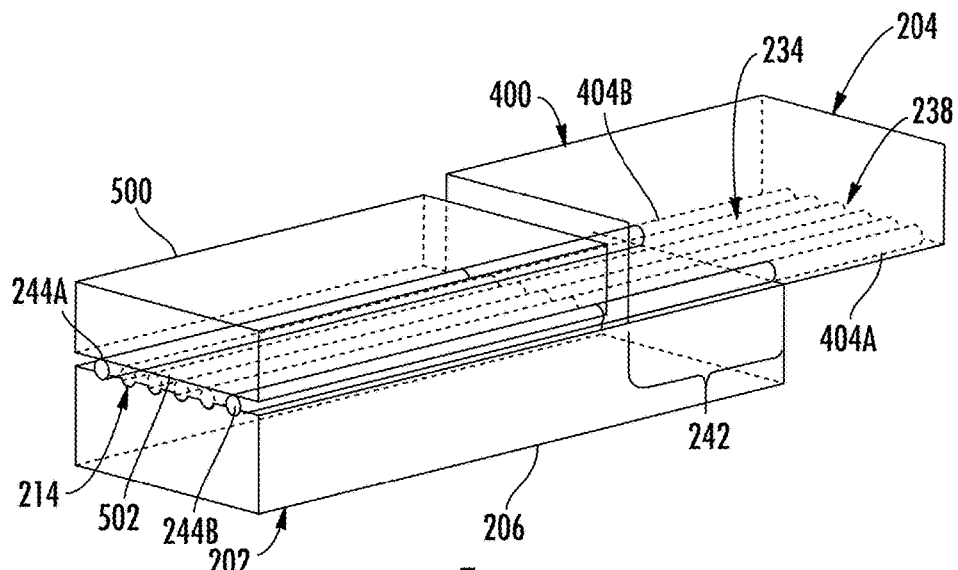
FIG. 5 is a perspective view of the fiber optic-to-waveguide coupling assembly of FIG. 4A with a fiber array unit cover with a planar bottom surface.

FIG. 5 is a perspective view of another embodiment of the fiber optic-to-waveguide coupling assembly 400 of FIG. 4A in which the fiber array unit (FAU) cover 500 has a planar bottom surface 502. In particular, the fiber array unit cover 500 is positioned over the first substrate 206 (outside of the first overlap 242). In other words, the fiber array unit cover 500 is at least partially positioned over the data fibers 220. The cover 500 (may also be referred to as a lid) includes the planar bottom surface 502 to push or compress the data fibers 220 (see FIG. 4A) and/or alignment cylinder 402 into the first substrate 206, where the first substrate 206 includes mounting grooves 214. Attachment of a cover 500 or interposer 204 can be with organic or inorganic adhesive, such as a UV or thermally curable epoxy, sol gel or liquid glass, or by a laser bonding process.

Figure 6:
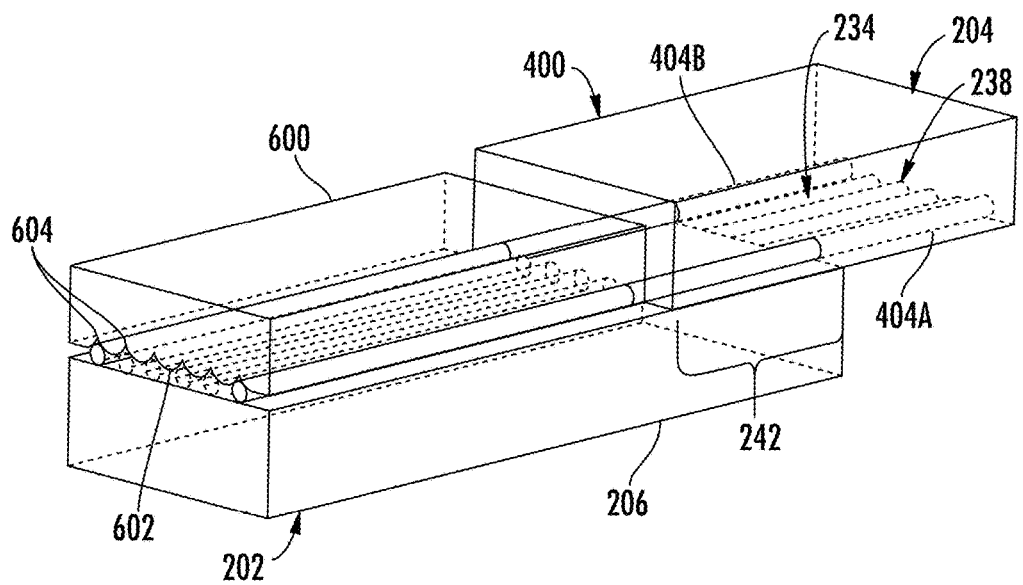
FIG. 6 is a perspective view of the fiber optic-to-waveguide coupling assembly of FIG. 4A with a fiber array unit cover with a grooved bottom surface.

FIG. 6 is a perspective view of the fiber optic-to-waveguide coupling assembly 400 of FIG. 4A with a fiber array unit cover 600 with a grooved bottom surface 602. In particular, the fiber array unit cover 600 includes v-grooves 604, with the data fiber 220 (see FIG. 4A) at least partially positioned within the one of the v-grooves 604. The bottom surface of the fiber array unit cover 600 pushes or compresses the data fibers 220 (see FIG. 4A) and/or alignment cylinder 402 into the first substrate 206.

Figure 7:
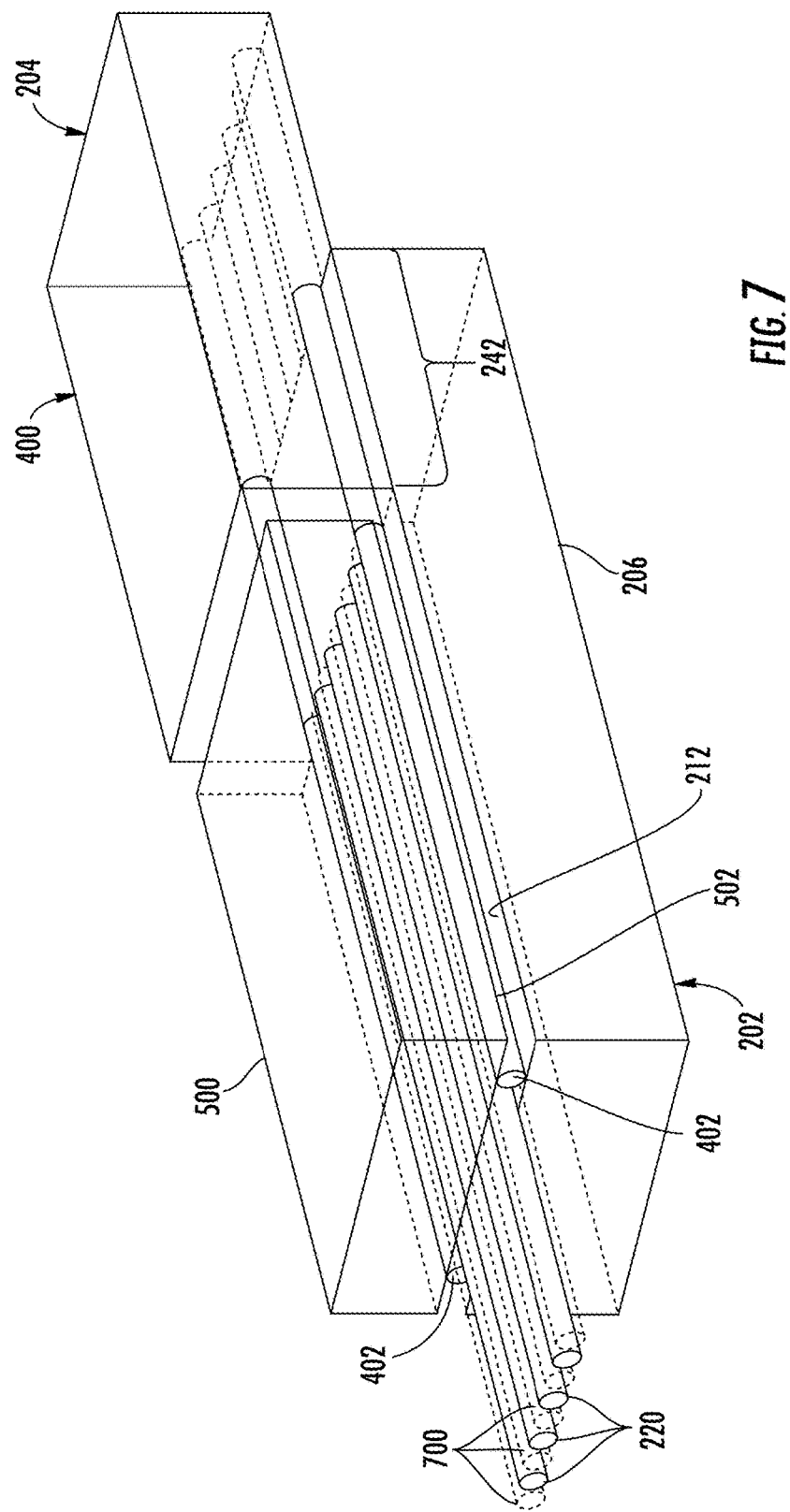
FIG. 7 is perspective view of another exemplary embodiment of the fiber optic-to-waveguide coupling assembly of FIGS. 2A-6 including pitch spacing fibers.

FIG. 7 is perspective view of another exemplary embodiment of the fiber optic-to-waveguide coupling assembly 400 of FIGS. 2A-6 including pitch spacing fibers 700. In this embodiment, the first coupler 202 further comprises a plurality of pitch spacing fibers 700 alternatingly interposed between the plurality of data fibers 220. In certain embodiments, the first surface 212 of the first substrate 206 and the bottom surface 502 of the fiber array unit cover 500 are both flat. Instead of grooves, pitch spacing fibers 700 of a certain diameter are compactly alternatingly interposed between the plurality of data fibers 220 between the alignment cylinders 402 to achieve the desired precise core pitch between the data fibers 220.

Figure 8A:
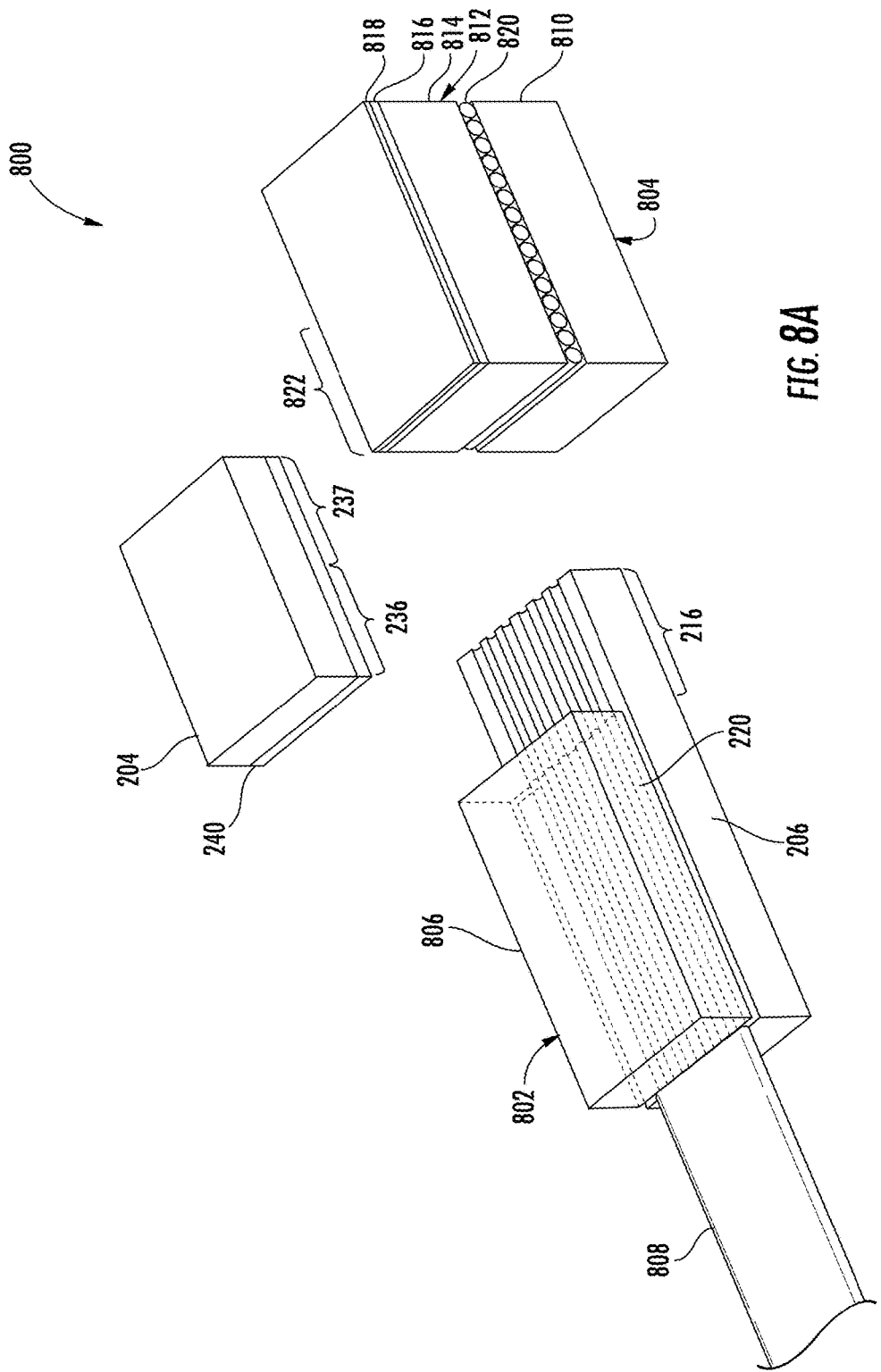
FIG. 8A is a perspective view of an exemplary fiber optic-to-waveguide coupling system including the fiber optic-to-waveguide coupling assembly of FIGS. 2A and 2B with the first coupler, the interposer, and the second coupler in a disengaged position.
Figure 8B:
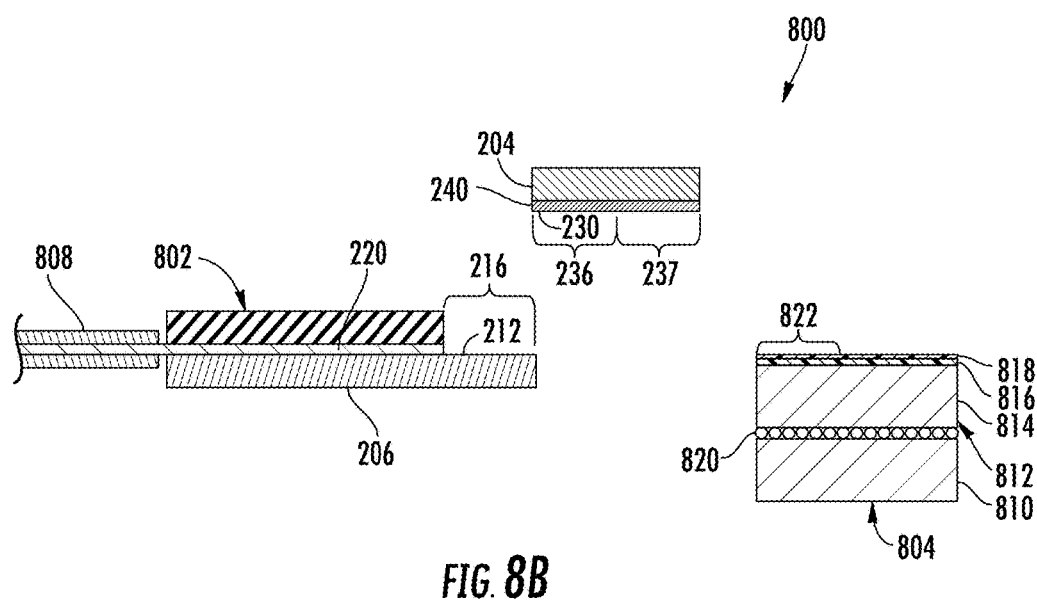
FIG. 8B is a cross-sectional side view of the exemplary fiber optic-to-waveguide coupling system of FIG. 8A with the first coupler, the interposer, and the second coupler in the disengaged position.
Figure 8C:
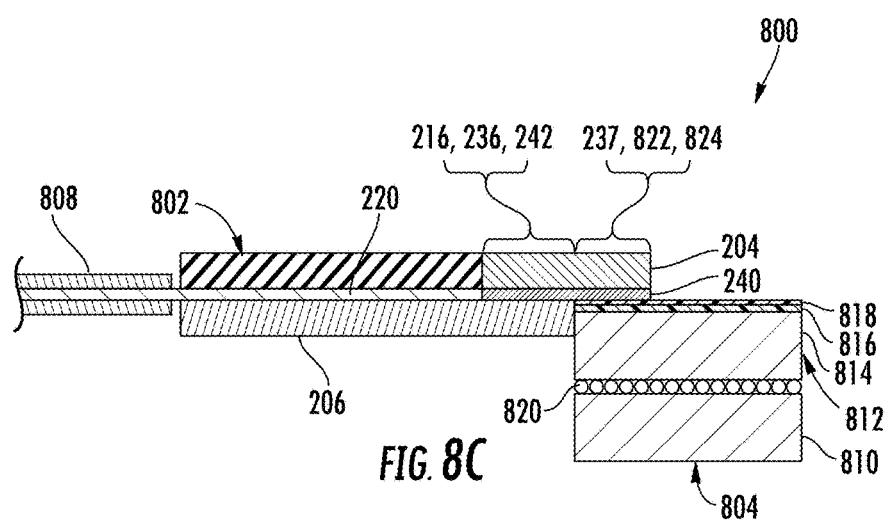
FIG. 8C is a cross-sectional side view of the exemplary fiber optic-to-waveguide coupling system of FIG. 8A with the first coupler, the interposer, and the second coupler in the engaged position.

FIGS. 8A-8C are views of an exemplary fiber optic-to-waveguide coupling system 800 including the fiber optic-to-waveguide coupling assembly of FIGS. 2A and 2B. It is noted that the orientation of the fiber optic-to-waveguide coupling system 800 is for illustrative purposes only and that assembly may occur in any orientation. Referring to FIGS. 8A and 8B, the fiber optic-to-waveguide coupling system 800 includes a first coupler 802, the interposer 204, and a second coupler 804 in a disengaged position. In particular, a first interposer overlap portion 236 of the first waveguides 240 of the interposer 204 is configured for edge coupling with data fibers 220 of the first coupler 802 and a second interposer overlap portion 237 of the first waveguides 240 are configured for evanescent coupling with second waveguides of the second coupler 804 (see FIG. 8C).

The first coupler 802 includes a first substrate 206 and a cover 806 with data fibers 220 positioned therebetween, and a jacket 808 surrounding a portion of the data fibers 220. The second coupler 804 includes a waveguide circuit 812 (e.g., planar lightwave circuit (PLC) and/or photonic integrated circuit (PIC) (e.g., silicon photonic circuit)) in communication with the interposer 204, and a second substrate 810 (may also be referred to as a carrier substrate) attached to the waveguide circuit 812 (via solder bumps 820) and in electrical communication with the waveguide circuit 812. In certain embodiments, the second substrate 810 includes a printed circuit board (PCB). The waveguide circuit 812 includes electrical circuitry mounted to the second substrate 810 and/or optical components (e.g., wavelength multiplexers, couplers, and/or taps, etc.). In particular, the waveguide circuit 812 includes a third substrate 814, a buried oxide layer 816, and a silicon waveguide 818 (with the buried oxide layer 816 positioned between the third substrate 814 and the silicon waveguide 818 to separate the layers). The silicon waveguide 818 may include a silicon photonic integrated circuit (e.g., including modulators, detectors, etc.) and is evanescently coupled with the waveguides 240 of the interposer 204. In other words, the silicon waveguides 818 are placed proximate the waveguides 240 of the interposer 204 so that their optical fields overlap. Adiabatic or evanescent coupling reduces or eliminates edge quality issues since the light coupling is from the top surface of the planar waveguides, and relaxes the alignment tolerance in the direction of propagation. Further, end faces of the waveguides 240 do not need to be polished or finished. See U.S. patent application Ser. No. 15/797,355, filed Oct. 30, 2017, the contents of which are hereby incorporated herein by reference.

Referring to FIG. 8C, the fiber optic-to-waveguide coupling system 800 includes the first coupler 802 and the second coupler 804 in an engaged position with the interposer 204 for communication between the first coupler 802 and the second coupler 804. In particular, the interposer 204 (may also be referred to as a third coupler) is edge coupled to the first coupler 802 and evanescently coupled to the second coupler 804. In other words, at least a portion of the first surface 212 of the first substrate 206 of the first coupler 802 is positionable proximate at least a portion of the second surface 230 of the interposer 204 to form a first overlap 242 therebetween to align at least one data fiber 220 of the first coupler 802 with at least one of the plurality of waveguides 240 of the second coupler in a y direction along the y axis intersecting the first surface 212 of the first substrate 206 and the second surface 230 of the interposer 204. At least a portion (e.g., a second coupler overlap portion 822) of the second coupler 804 is positionable proximate at least a portion (e.g., a second interposer overlap portion 237) of the second surface 230 of the interposer 204 to form a second overlap 824 therebetween to evanescently couple the interposer 204 and the second coupler 804.

Once aligned, the interposer 204 is fixedly attached to the first substrate 206 (e.g., by adhesive, etc.). The waveguides 240 act as intermediate waveguides (e.g., intermediate glass waveguides, intermediate ion-exchange glass waveguides, polymer waveguides, intermediate silicon waveguides, etc.) in optical communication between the data fibers 220 and the silicon waveguide 818. Circuitry in the silicon waveguide 818 converts the optical signal to an electrical signal and transmits the electrical signal to electronic components on the second substrate 810 through the solder bumps 820. As discussed above, when engaged, the data fibers 220 of the first coupler 802 are aligned with the waveguides 240 of the interposer 204 of the second coupler 804 for optical communication therebetween.

Figure 9:
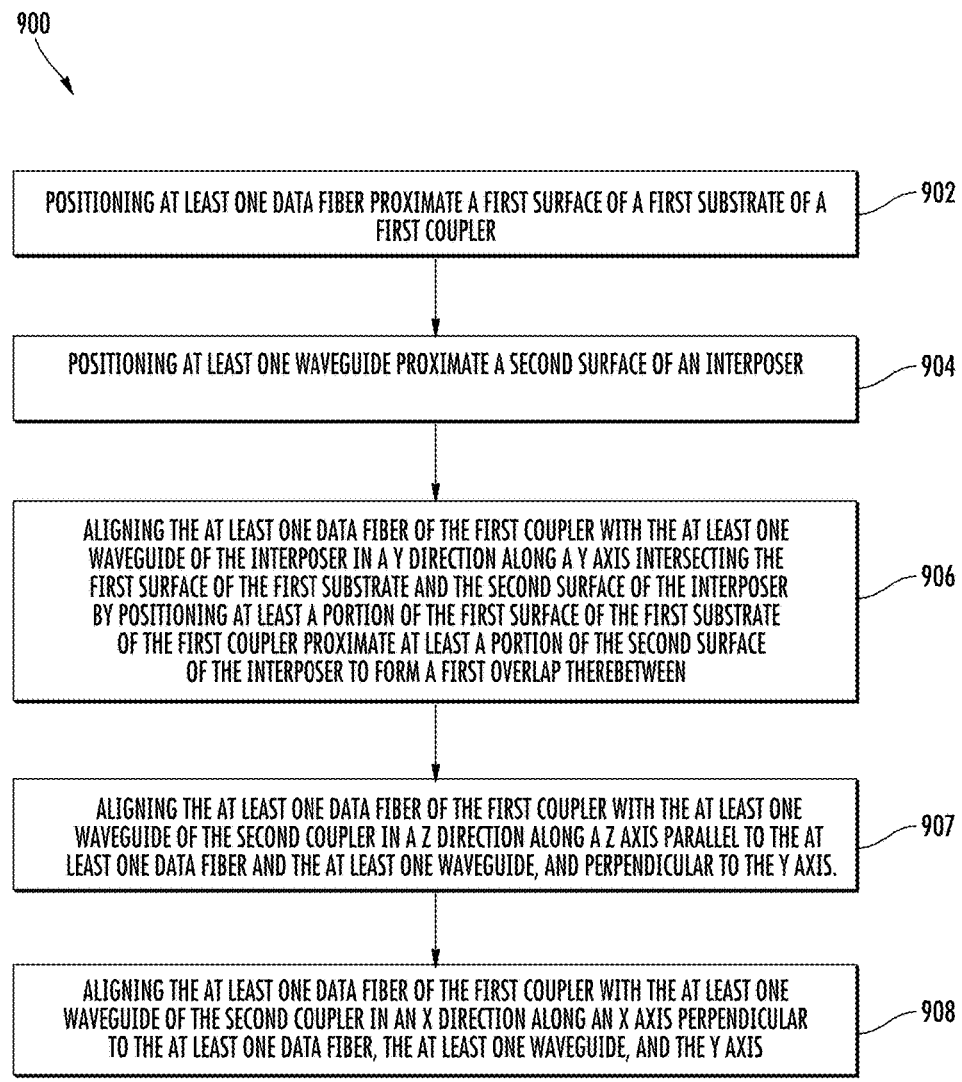
FIG. 9 is a flowchart of the steps for manufacturing the fiber optic-to-waveguide coupling assembly of FIGS. 2A-8C.

FIG. 9 is a flowchart of steps 900 for manufacturing the fiber optic-to-waveguide coupling assembly of FIGS. 2A-8C. In step 902, at least one data fiber is positioned proximate a first surface of a first substrate of a first coupler. In step 904, at least one waveguide is positioned proximate a second surface of an interposer. In step 906, the at least one data fiber of the first coupler is aligned with the at least one waveguide of the interposer in a y direction along a y axis intersecting the first surface of the first substrate and the second surface of the interposer by positioning at least a portion of the first surface of the first substrate of the first coupler proximate at least a portion of the second surface of the interposer to form a first overlap therebetween. In step 907, the at least one data fiber of the first coupler is aligned with the at least one waveguide of the second coupler in a z direction along a z axis parallel to the at least one data fiber and the at least one waveguide, and perpendicular to the y axis (e.g., by moving the first substrate in the z direction with respect to the interposer). In step 908, the at least one data fiber of the first coupler is aligned with the at least one waveguide of the second coupler in an x direction along an x axis perpendicular to the at least one data fiber, the at least one waveguide, and the y axis. In some embodiments, the interposer is then aligned with a second coupler that includes a plurality of silicon waveguides. The waveguides of the interposer are aligned with the silicon waveguides of a second coupler by placing at least a portion of the second surface of the interposer in contact with the second coupler.

In certain embodiments, the interposer is attached to the first coupler before the interposer is attached to the second coupler. In certain embodiments, the interposer is attached to the second coupler before the interposer is attached to the first coupler.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic-to-waveguide coupling assembly, comprising:
    a first coupler comprising:
        a first substrate comprising a first surface; and
        at least one data fiber positioned proximate the first surface; and
    an interposer comprising a second surface and at least one waveguide positioned proximate the second surface;
    wherein at least a first portion of the first surface of the first substrate of the first coupler is positioned proximate at least a second portion of the second surface of the interposer to form a first overlap between the first portion of the first surface and the second portion of the second surface to align the at least one data fiber of the first coupler with the at least one waveguide of the interposer to allow for transmitting a signal between the at least one data fiber and the at least one waveguide;
    wherein the at least one data fiber of the first coupler does not extend into the first overlap and the at least one waveguide of the interposer extends into the first overlap.

2. The fiber optic-to-waveguide coupling assembly of claim 1, wherein the first surface of the first substrate contacts the second surface of the interposer.

3. The fiber optic-to-waveguide coupling assembly of claim 1, wherein the first surface and the second surface are planar.

4. The fiber optic-to-waveguide coupling assembly of claim 1, wherein the second surface of the interposer comprises at least one waveguide channel, the at least one waveguide positioned in the at least one waveguide channel.

5. The fiber optic-to-waveguide coupling assembly of claim 1, wherein the at least one waveguide comprises a glass waveguide.

6. The fiber optic-to-waveguide coupling assembly of claim 1, wherein the first substrate defines at least one mounting groove and the at least one data fiber is positioned in the at least one mounting groove.

7. The fiber optic-to-waveguide coupling assembly of claim 6, wherein the at least one mounting groove does not extend the entire length of the first substrate.

8. The fiber optic-to-waveguide coupling assembly of claim 7, wherein the at least one mounting groove terminates at a trench that is transverse to the at least one mounting groove.

9. The fiber optic-to-waveguide coupling assembly of claim 1, wherein the first substrate comprises at least one substrate alignment fiducial on the first surface.

10. The fiber optic-to-waveguide coupling assembly of claim 1, wherein the first substrate comprises at least one substrate alignment groove in the first surface.

11. The fiber optic-to-waveguide coupling assembly of claim 10,
wherein the first substrate comprises at least one mounting groove in the first surface and the at least one data fiber is positioned in the at least one mounting groove; and
wherein a depth of the at least one substrate alignment groove is greater than a depth of the at least one mounting groove.

12. The fiber optic-to-waveguide coupling assembly of claim 10,
wherein the first substrate comprises a plurality of evenly-spaced mounting grooves in the first surface; and
wherein a spacing between the evenly-spaced mounting grooves is same as a spacing between the at least one substrate alignment groove and an adjacent evenly-spaced mounting groove.

13. The fiber optic-to-waveguide coupling assembly of claim 10, wherein the interposer further comprises at least one interposer alignment fiducial on the second surface of the interposer, the at least one interposer alignment fiducial is positioned to facilitate alignment between the at least one data fiber and the at least one waveguide when the at least one interposer alignment fiducial is aligned with the at least one substrate alignment groove.

14. The fiber optic-to-waveguide coupling assembly of claim 13, wherein the at least one interposer alignment fiducial is photolithographically defined.

15. The fiber optic-to-waveguide coupling assembly of claim 13, wherein the interposer comprises a material that is transparent to visible light.

16. The fiber optic-to-waveguide coupling assembly of claim 10, wherein the first coupler further comprises at least one alignment cylinder positioned in the at least one substrate alignment groove.

17. The fiber optic-to-waveguide coupling assembly of claim 16, wherein the at least one alignment cylinder comprises a non-data optical fiber.

18. The fiber optic-to-waveguide coupling assembly of claim 16, wherein a diameter of the at least one alignment cylinder is the same as a diameter of the at least one data fiber.

19. The fiber optic-to-waveguide coupling assembly of claim 16, wherein the interposer defines at least one interposer alignment groove configured to receive at least a portion of the at least one alignment cylinder to align the at least one data fiber of the first coupler with the at least one waveguide of the interposer.

20. The fiber optic-to-waveguide coupling assembly of claim 1, wherein the first coupler further comprises a cover, and wherein the at least one data fiber is positioned between the cover and the first substrate.

21. The fiber optic-to-waveguide coupling assembly of claim 20, wherein the cover comprises at least one v-groove and the at least one data fiber at least partially positioned within the at least one v-groove.

22. The fiber optic-to-waveguide coupling assembly of claim 1,
wherein the at least one data fiber of the first coupler further comprises a plurality of data fibers; and
wherein the first coupler further comprises a plurality of pitch spacing fibers alternatingly interposed between the plurality of data fibers.

23. A fiber optic-to-waveguide coupling system, comprising:
a first coupler comprising:
a first substrate comprising a first plurality of mounting grooves defined in a first surface of the first substrate; and
a fiber array comprising a plurality of data fibers, each of the plurality of data fibers positioned in one of the first plurality of mounting grooves;
a second coupler comprising a plurality of silicon waveguides; and
an interposer comprising:
a plurality of waveguide channels defined in a second surface of the interposer;
a plurality of waveguides, wherein each of the plurality of waveguides is positioned in one of the plurality of waveguide channels;
wherein at least a portion of the first surface of the first substrate of the first coupler is positioned proximate at least a portion of the second surface of the interposer to form a first overlap therebetween to align the plurality of data fibers of the first coupler with the plurality of waveguides of the interposer; and
wherein at least a portion of the silicon waveguide of second coupler is positioned proximate at least a portion of the second surface of the interposer to form a second overlap therebetween to evanescently couple signals from the plurality of waveguides to the plurality of silicon waveguides;
wherein the at least one data fiber does not extend into the first overlap.

24. The fiber optic-to-waveguide coupling system of claim 23, wherein the first surface of the first substrate contacts the second surface of the interposer.

25. A method of manufacturing a fiber optic-to-waveguide coupling assembly, comprising:
positioning at least one data fiber proximate a first surface of a first substrate of a first coupler;

positioning at least one waveguide proximate a second surface of an interposer;

aligning the at least one data fiber of the first coupler with the at least one waveguide of the interposer by placing at least a portion of the first surface of the first substrate of the first coupler in contact with at least a portion of the second surface of the interposer to form a first overlap therebetween; and aligning the at least one waveguide of the interposer with at least one silicon waveguide of a second coupler by placing at least a portion of the second surface of the interposer in contact with the second coupler;

wherein the at least one data fiber of the first coupler does not extend into the first overlap and the at least one waveguide of the interposer extends into the first overlap.

* * * * *